(12) United States Patent
Niu et al.

(10) Patent No.: US 11,397,698 B2
(45) Date of Patent: *Jul. 26, 2022

(54) ASYNCHRONOUS COMMUNICATION PROTOCOL COMPATIBLE WITH SYNCHRONOUS DDR PROTOCOL

(71) Applicant: SAMSUNG ELECTRONICS CO., LTD., Suwon-si (KR)

(72) Inventors: Dimin Niu, Sunnyvale, CA (US); Mu-Tien Chang, Santa Clara, CA (US); Hongzhong Zheng, Los Gatos, CA (US); Sun Young Lim, Hwasung (KR); Indong Kim, Hwasung (KR); Jangseok Choi, Campbell, CA (US); Craig Hanson, Champlin, MN (US)

(73) Assignee: Samsung Electronics Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 16/777,206

(22) Filed: Jan. 30, 2020

(65) Prior Publication Data

US 2020/0167297 A1 May 28, 2020

Related U.S. Application Data

(63) Continuation of application No. 15/233,850, filed on Aug. 10, 2016, now Pat. No. 10,621,119.

(Continued)

(51) Int. Cl.
*G06F 13/16* (2006.01)
*G06F 13/42* (2006.01)
*G06F 13/40* (2006.01)

(52) U.S. Cl.
CPC ...... *G06F 13/1673* (2013.01); *G06F 13/4068* (2013.01); *G06F 13/42* (2013.01)

(58) Field of Classification Search
CPC ... G06F 13/1673; G06F 13/4068; G06F 13/42
See application file for complete search history.

(56) References Cited

U.S. PATENT DOCUMENTS

| | | | |
|---|---|---|---|
| 5,737,258 A | 4/1998 | Choi et al. | |
| 6,154,821 A | 11/2000 | Barth et al. | |

(Continued)

FOREIGN PATENT DOCUMENTS

| | | | |
|---|---|---|---|
| CN | 104409097 A | 3/2015 | |
| JP | 08306195 A | 11/1996 | |

(Continued)

OTHER PUBLICATIONS

Peng Qiang et al., "A Novel NAND Flash Memory Controller Compatible with Asynchronous and Source Synchronous Data Types," IEEE 11th International Conference on Solid-State and Integrated Circuit Technology, Oct. 2012, 3 pages.

*Primary Examiner* — Henry Tsai
*Assistant Examiner* — Aurangzeb Hassan
(74) *Attorney, Agent, or Firm* — Innovation Counsel LLP

(57) ABSTRACT

A memory module includes: a non-volatile memory; and an asynchronous memory interface to interface with a memory controller. The asynchronous memory interface may use repurposed pins of a double data rate (DDR) memory channel to send an asynchronous data to the memory controller. The asynchronous data may be device feedback indicating a status of the non-volatile memory.

20 Claims, 11 Drawing Sheets

Related U.S. Application Data

(60) Provisional application No. 62/347,569, filed on Jun. 8, 2016, provisional application No. 62/303,349, filed on Mar. 3, 2016.

(56) References Cited

U.S. PATENT DOCUMENTS

| | | |
|---|---|---|
| 7,062,618 B2 | 6/2006 | Tsunoda et al. |
| 7,269,709 B2 | 9/2007 | Kelly |
| 7,386,768 B2 | 6/2008 | Vogt et al. |
| 7,620,783 B2 | 11/2009 | Wolford et al. |
| 7,640,413 B2 | 12/2009 | Lovett |
| 7,716,411 B2 | 5/2010 | Panabaker et al. |
| 7,917,688 B2 | 3/2011 | Tanaka et al. |
| 8,064,250 B2 | 11/2011 | Abdulla |
| 8,261,136 B2 | 9/2012 | D'Abreu et al. |
| 8,359,521 B2 | 1/2013 | Kim et al. |
| 8,588,017 B2 | 11/2013 | Park et al. |
| 8,593,889 B2 | 11/2013 | Nobunaga et al. |
| 8,737,148 B2 | 5/2014 | Byom et al. |
| 8,745,321 B2 | 6/2014 | Rajan et al. |
| 8,819,354 B2 | 8/2014 | Seto et al. |
| 8,924,639 B2 | 12/2014 | Ahn et al. |
| 9,142,272 B2 | 9/2015 | Van Huben et al. |
| 9,214,199 B2 | 12/2015 | Brandl et al. |
| 9,405,608 B2 | 8/2016 | Okubo et al. |
| 9,460,791 B1 | 10/2016 | Shallal et al. |
| 9,569,144 B2 | 2/2017 | Uematsu et al. |
| 9,830,086 B2 | 11/2017 | Niu et al. |
| 2001/0003198 A1 | 6/2001 | Wu |
| 2005/0066137 A1 | 3/2005 | Jeddeloh et al. |
| 2006/0067156 A1* | 3/2006 | Ruckerbauer ....... G11C 11/4076 365/221 |
| 2007/0030030 A1* | 2/2007 | Waldrop ................. G11C 7/22 326/93 |
| 2008/0082750 A1 | 4/2008 | Okin et al. |
| 2010/0005214 A1 | 1/2010 | Trombley et al. |
| 2010/0110748 A1 | 5/2010 | Best |
| 2012/0331356 A1 | 12/2012 | Vogt et al. |
| 2014/0192583 A1* | 7/2014 | Rajan ....................... G11C 5/06 365/63 |
| 2014/0237157 A1* | 8/2014 | Takefman ........... G06F 11/1008 711/3 |
| 2014/0281326 A1* | 9/2014 | Van Huben ............ G06F 13/42 711/167 |
| 2014/0359391 A1 | 12/2014 | Pawlowski |
| 2015/0019831 A1 | 1/2015 | Van Huben et al. |
| 2015/0268959 A1 | 9/2015 | Krishna et al. |
| 2015/0309742 A1 | 10/2015 | Amidi et al. |
| 2016/0085585 A1 | 3/2016 | Chen et al. |
| 2016/0125923 A1* | 5/2016 | Lee ......................... G11C 8/18 365/226 |
| 2017/0255575 A1* | 9/2017 | Niu ......................... G06F 13/42 |

FOREIGN PATENT DOCUMENTS

| | | |
|---|---|---|
| JP | 2001-10865 A | 1/2001 |
| JP | 2001-14842 A | 1/2001 |
| JP | 2003091463 A | 3/2003 |
| JP | 2005-537543 A | 12/2005 |
| JP | 2008171163 A | 7/2008 |
| JP | 2009054116 A | 3/2009 |
| JP | 2009540431 A | 11/2009 |
| JP | 2010-153018 A | 7/2010 |
| JP | 2011-530734 A | 12/2011 |
| JP | 2012089137 A | 5/2012 |
| JP | 2012146360 A | 8/2012 |
| JP | 2014157391 A | 8/2014 |
| TW | 246081 B | 12/2005 |
| TW | 201015338 A | 4/2010 |
| TW | 201732615 A | 9/2017 |
| WO | 2014155593 A1 | 2/2014 |
| WO | 2014143056 A1 | 9/2014 |

\* cited by examiner

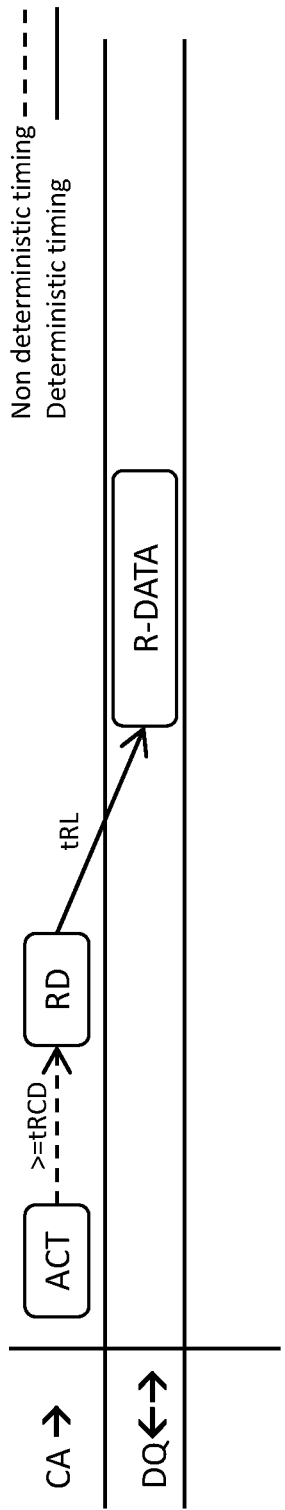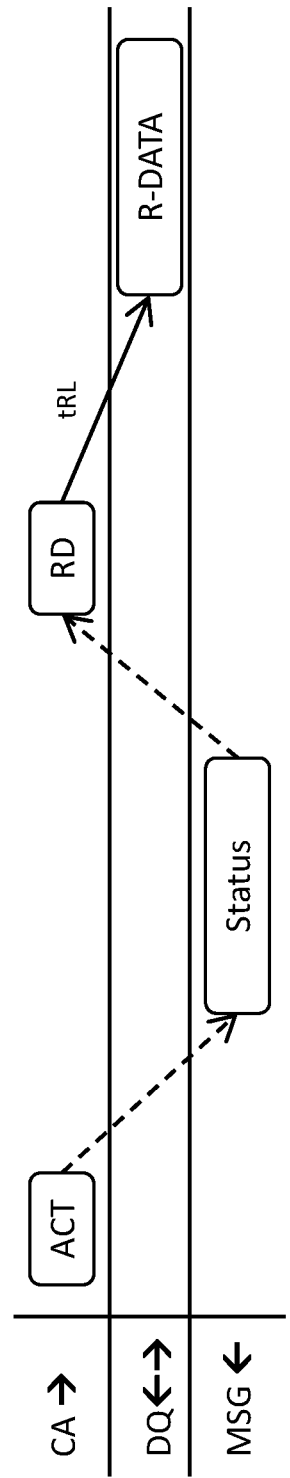
FIG. 2A (prior art)
FIG. 2B

| Function | CKE Previous Cycle | CKE Current Cycle | ACT_n | RAS_N/A16 | CAS_N/A15 | WE_n/A14 | C0-C2 | BG1 | BG0 | BA1 | BA0 | A17 | A13 | BC_n/A12 | A11 | A10/AP | A0-A9 |
|---|---|---|---|---|---|---|---|---|---|---|---|---|---|---|---|---|---|
| NVM Read (RD) | H | H | H | H | L | H | V | BG | BG | BA | BA | | | EA | | X | CA |
| NVM Write (WR) | H | H | H | H | L | L | V | BG | BG | BA | BA | | | EA | | X | CA |
| NVM Extension | H | H | H | L | H | H | V | BG | BG | BA | BA | | | EA | | X | CA |
| NVM Send (SEND) | H | H | H | L | H | H | X | X | L | L | H | H | H | RFU | RFU | Pri | Transaction ID |
| Read Status (RS) | H | H | H | L | H | H | X | X | L | H | L | L | H | RFU | RFU | RFU | Burst Count |
| RFU | H | H | H | L | H | H | | | RFU | | | L | L | | RFU | | SFR addr |

FIG. 3E

|  | Example 1 | Example 2 | Example 3 | Example 4 | Example 5 |
|---|---|---|---|---|---|
| Total # Pins Available for Feedback Status | 4 |  | 8 | 10 | 5 |
| Repurposed Pins for Feedback Status | CKE1(203), CS1_n(89), ODT_1(91), Alert_n | CKE1(203), CS1_n(89), ODT_1(91), CK1_c (219) RFU(144, 205, 227) | CKE1(203), CS1_n(89), ODT_1(91), CK1_t (218), CK1_c | Pins from Example 2/3 + C0(93), C1(89) | CKE1(203), CS1_n(89), ODT_1(91), CK1_t (218 ), CK1_c (219 |
| Speed |  |  | SDR |  |  |
| Limitations | Maximum 8 Logic R/C | Maximum 8 Logic R/C | Maximum 8 logic R/C | Maximum 2 logic R/C | NO DDP, No 3DS 1 Rank/Channel Maximum 1 R/C |
| Comments | Less changes in PHY | Can have up to 8 R/C with changes in JEDEC support 3D stack organization | Similar to example 2, 1 less pin repurpose Complex changes for 8 R/C | 2 more pins for feedback 2 less rank | Do not use RFU pins |

FIG. 5

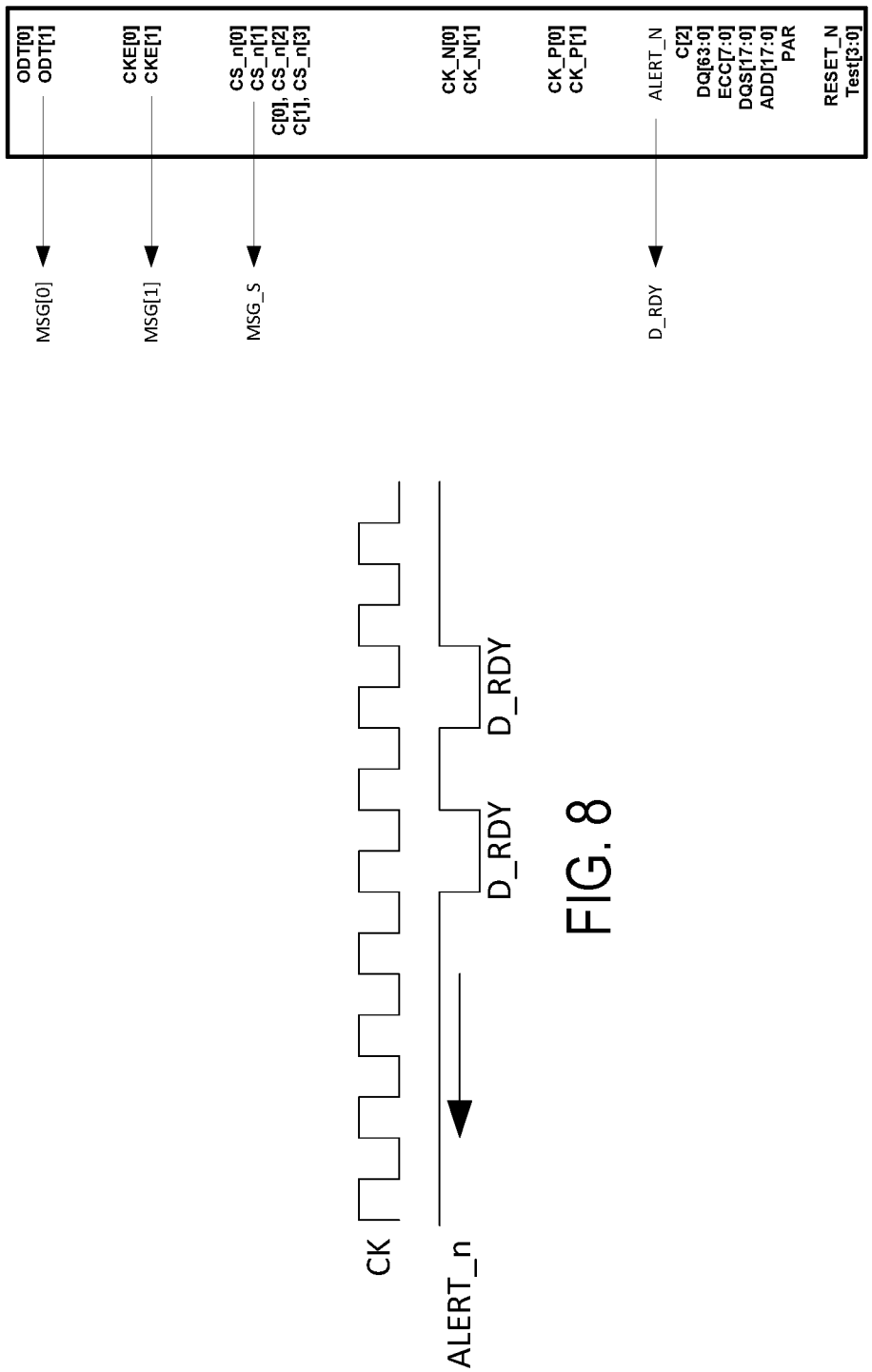

ASYNCHRONOUS COMMUNICATION PROTOCOL COMPATIBLE WITH SYNCHRONOUS DDR PROTOCOL

CROSS-REFERENCE TO RELATED APPLICATION(S)

This application is a continuation of U.S. patent application Ser. No. 15/233,850 filed Aug. 10, 2016, which claims the benefits of and priority to U.S. Provisional Patent Application Ser. Nos. 62/303,349 filed Mar. 3, 2016 and 62/347,569 filed Jun. 8, 2016, the disclosures of which are incorporated herein by reference in their entirety.

TECHNICAL FIELD

The present disclosure relates generally to memory systems, more particularly, to an asynchronous communication protocol compatible with the standard synchronous double data rate (DDR) protocol.

BACKGROUND

Dynamic random access (DRAM) modules such as double data rate (DDR) synchronous dynamic random-access memories (SRAMs) use a synchronous communications protocol (i.e., DDR protocol). A memory controller is responsible for the synchronous timing, control, and data movement to and from the DRAM. In that regards, the DRAM is a slave device and DRAM provides only limited feedback to the memory controller.

Future memory interfaces may be transactional interfaces. Transactional interfaces can support both non-volatile and volatile memories co-located on a memory channel as a main memory. However, transactional interfaces involve variable timings, and much more feedback is expected from a memory-channel device. Therefore, there is a need for a transaction-based asynchronous communication protocol to support a memory module including non-volatile memories or both non-volatile and volatile memories that can provide device feedback to a memory controller.

SUMMARY

According to one embodiment, a memory module includes: a non-volatile memory; and an asynchronous memory interface to interface with a memory controller. The asynchronous memory interface may use repurposed pins of a double data rate (DDR) memory channel to send an asynchronous data to the memory controller.

According to another embodiment, a system includes: a memory controller; a memory module comprising a non-volatile memory; and an asynchronous memory interface between the memory controller and the memory module. The asynchronous memory interface may use repurposed pins of a DDR memory channel to send device feedback of the memory module to the memory controller.

According to yet another embodiment, a method includes: providing an asynchronous memory interface between a memory controller and a memory module, wherein the memory module comprising a non-volatile memory; and sending device feedback of the memory module to the memory controller using repurposed pins of a double data rate (DDR) memory channel.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

FIG. 2A illustrates a timing diagram of a read cycle using the standard DDR protocol.

FIG. 2B illustrates a timing diagram of an example read cycle using an extended RAS-CAS protocol, according to one embodiment;

FIG. 3E shows a table showing the definition of various commands, according to one embodiment;

FIG. 5 is a table showing four examples of dedicated feedback pins, according to one embodiment;

FIG. 8 illustrates an example of a signal diagram for an ALERT_n pin carrying a Read_Ready signal, according to one embodiment;

FIG. 9 illustrates an example of repurposed message pin assignment and message definition, according to one embodiment;

Figure 1:
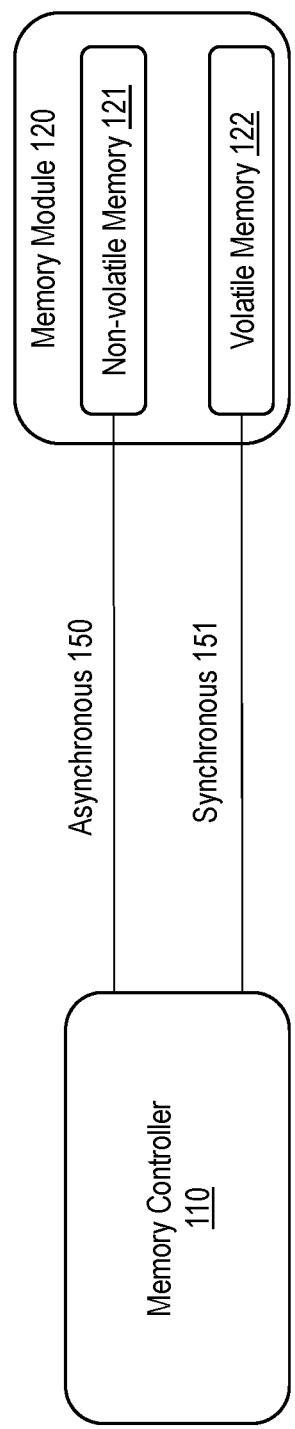
FIG. 1 illustrates an example asynchronous communication protocol, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide an asynchronous communication protocol compatible with the standard synchronous protocol. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure provides an asynchronous communication protocol that is compatible with various versions of double data rate (DDR) memories (e.g., DDR1, DDR2, DDR3, and DDR4). The present asynchronous communication protocol can support memory modules with variable read, write, and/or activation latencies. The asynchronous memory modules can include both a non-volatile memory and/or a volatile memory (e.g., DRAM) that are co-located on the same memory channel. In addition, the present asynchronous communication protocol allows a memory module to provide device feedback to a memory controller. The terms, a dual in-line memory module (DIMM) and a memory module, may be interchangeably used herein. The DIMM may be a standard DIMM including DRAM, an NVDIMM including NVM, or a hybrid DIMM including both DRAM and NVM.

Examples of NVDIMM type memories include, but are not limited to, a non-volatile memory (NVM) DIMM including NVM and a hybrid DIMM including both NVM and DRAM. The NVM DIMM provides direct access to a NVM as a memory. The hybrid DIMM can operate either in a direct mode or a cache mode. In the direct mode, the hybrid DIMM provides direct access as a memory similar to NVM DIMM. The DRAM and the NVM in the hybrid DIMM have different address range. A host can send DRAM operations and NVM operations to the DRAM and the NVM separately with different address range. For example, the C[2] pin in the DDR standard can be used to separate the address range of the DRAM and the NVM. When the C[2] pin is low (set to '0'), the DRAM is selected; and if C[2] pin is high (set to '1'), the NVM is selected. In the cache mode, the DRAM acts as a cache of the NVM. The DRAM cache is transparent to the host and is managed by a controller internal to the hybrid DIMM.

FIG. 1 illustrates an example asynchronous communication protocol, according to one embodiment. The present asynchronous communication protocol is compatible with DDR4 for chip and module interfaces. The memory module 120 can include a non-volatile memory 121, a volatile memory 122 (e.g., DRAM), or both. Examples of the non-volatile memory 121 include, but are not limited to, a flash memory, a phase-change RAM (PRAM), a spin-transfer torque magnetic random access memory (STT-MRAM), and a resistive RAM (ReRAM). A memory controller 110 can provide an asynchronous communication protocol 150 to interface with the non-volatile memory 121 and a synchronous communication protocol 151 to interface with the volatile memory 122. The asynchronous communication protocol 150 and the synchronous communication protocol 151 can share the same physical DDR channel or have dedicated physical DDR channels.

According to one embodiment, the present asynchronous communication protocol extends the traditional synchronous DDR protocol utilizing row address select (or strobe) (RAS)—column address strobe (strobe) (CAS). The traditional synchronous DDR protocol is also referred to as a RAS-CAS protocol or a standard DDR protocol. The extended RAS-CAS protocol extends or repurposes DRAM and module pins specified for the standard DDR protocol and provides the asynchronous interface 150 between the memory controller 110 and the non-volatile memory 121 of the memory module 120. Because the present asynchronous communication protocol uses extended or repurposed DRAM and module pins, the non-volatile memory 121 and the volatile memory 122 can be co-located on the same memory module 120 and communicate with the memory controller 110 over the same memory channel (e.g., DDR memory channel). Further, the present asynchronous communication protocol allows the memory module 120 to provide device feedback to the memory controller 110 over the DDR memory channel using the present asynchronous communication protocol.

FIG. 2A illustrates a timing diagram of a read cycle using the standard DDR protocol. To read the data from a memory cell of a memory device included in a memory module, the cell must be selected by its row and column coordinates, the charge on the cell must be sensed, amplified, and sent to the support circuitry, and the data must be sent to the data output pin of the memory device. Row address strobe (strobe) (RAS) is used to latch the row address and to initiate a memory cycle. Column address strobe (strobe) (CAS) is used to latch the column address and to initiate either a read cycle or a write cycle.

In terms of timing for a read cycle, a read cycle can occur in the following order. First, a memory controller generates an activate (ACT) command to start a read cycle to read data from a memory module. The ACT command delivers the row address to the address input pins on the memory module, and RAS is latched. A column address is then applied to the address input pins on the memory module. A read signal RD can be latched to initiate a read operation prior to the transition of CAS. The CAS is then latched. After a predetermined time, the requested data appears at the data output pins of the memory module. The time at which the data appears after the read signal RD is set may depend on timings of various signals including the RAS and CAS and predetermined delays between signals. Before the read cycle is complete, CAS and RAS can return to their inactive states.

FIG. 2B illustrates a timing diagram of an example read cycle using an extended RAS-CAS protocol, according to one embodiment. The terms, extended RAS-CAS protocol and asynchronous communication protocol, may be interchangeably used herein. The extended RAS-CAS protocol allows a non-volatile memory (NVM) of a memory module to communicate with a memory controller by repurposing one or more dedicated or shared data pins of the memory module. The memory module can also provide feedback to the memory controller using the repurposed pins. Although the example described with reference to the timing diagram of FIG. 2B is a read cycle for a non-volatile memory (e.g., PCM) or a volatile memory (e.g., DRAM), it is understood that the extended RAS-CAS protocol can be applied to a write cycle or a read-modify-write cycle without deviating from the scope of the present disclosure.

Unlike the standard synchronous DDR protocol as illustrated in FIG. 2A where the timing of the read data appearing on the data output pins of the memory module is temporally predictable and deterministic, the extended RAS-CAS protocol allows asynchronously exchange of data between the memory controller and the memory module. For example, in response to an activate (ACT) command is posted on the DDR4 memory channel, the memory module can provide device feedback, for example, a status of itself to the memory controller. The memory module can include a non-volatile memory or include a non-volatile memory in addition to a volatile memory. In this case, the device feedback may indicate that data is located in a data buffer of the non-volatile memory in a similar fashion to a DRAM open page. Based on the status of the memory module, the memory controller can determine when to post the read signal RD on the memory channel. After the read signal RD is latched, the requested data appears at the data output pins of the memory module after a predetermined time delay. The timing between the activate (ACT) command and the feedback signal, and the feedback signal and the read signal RD can vary, hence the present extended RAS-CAS protocol is asynchronous although it can be implemented to be compatible with a synchronous DDR memory channel.

According to one embodiment, the feedback status can indicate that the NVM data is located in a data buffer. The data buffer may store requested read data in a similar fashion to a DRAM open page. After the page is opened, all consecutive read (or write) access to the same page can have fixed DRAM latency.

According to one embodiment, the extended RAS-CAS protocol can extend and/or repurpose either dedicated or shared pins, and multiple links can be established between different dual in-line memory modules (DIMMs) in the same channel. The extended RAS-CAS protocol may require synchronization logic to provide shared device feedback from the memory module to the memory controller. In addition, the extended RAS-CAS protocol can provide support to in-module RAS feature by delivering device feedback.

According to another embodiment, the feedback status may include two type signals: a feedback message (MSG DQ) and a read ready signal (Read_Ready). The MSG_DQ is synchronous signal and is always aligned with data on the DQ bus. However, the Read_Ready signal is an asynchronous signal that is not necessary to aligned with data.

Figure 3A:
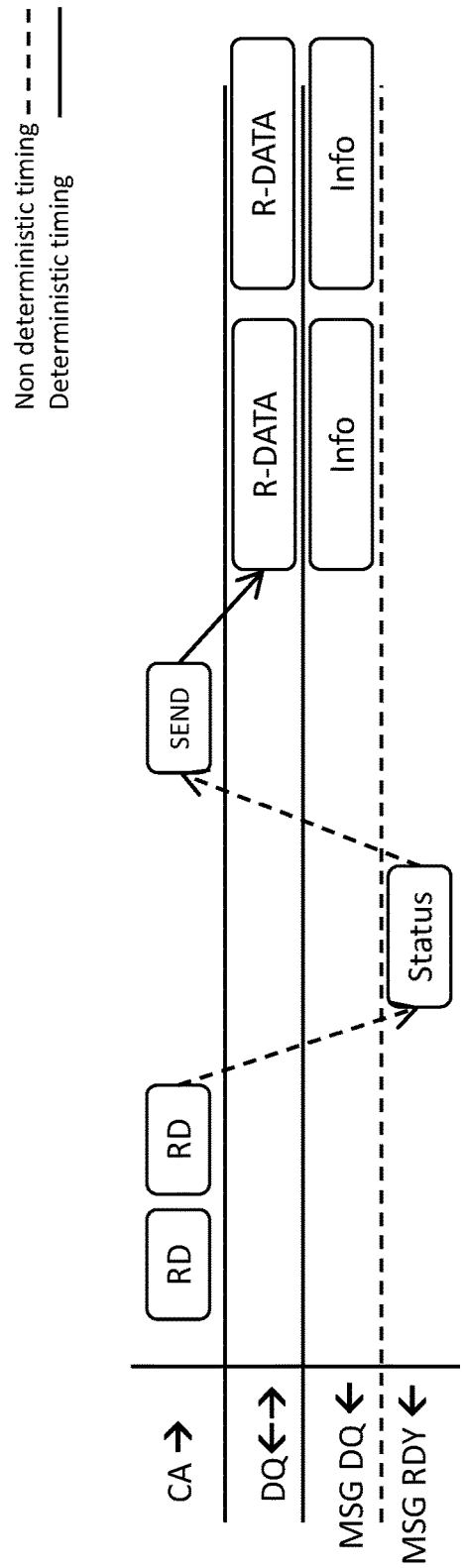
FIG. 3A illustrates a timing diagram of an example read cycle, according to one embodiment.

FIG. 3A illustrates a timing diagram of an example read cycle, according to one embodiment. The non-volatile memory or the volatile memory may not necessary have the concept/implementation of a page similar to a DRAM. Instead, in this asynchronous communication protocol, after an ACT command is issued, explicit feedback (e.g., Read_Ready) is required for each read signal RD. The Read_Ready signal can be delivered through a specific pin (or pins) in a feedback channel indicating that a data package is ready to be read by the host. After the memory controller receives the Read_Ready signal from the memory module, the memory controller can issue another command (e.g., SEND) to initiate data read transactions with deterministic timing to retrieve the data. After a predefined latency (e.g., tRL) after the transaction command (e.g., SEND), the read data is presented on the data bus. In addition to the data, information such as Read ID (RID) can be delivered through other pins in the feedback channel (e.g., MSG_DQ pins).

Figure 3B:
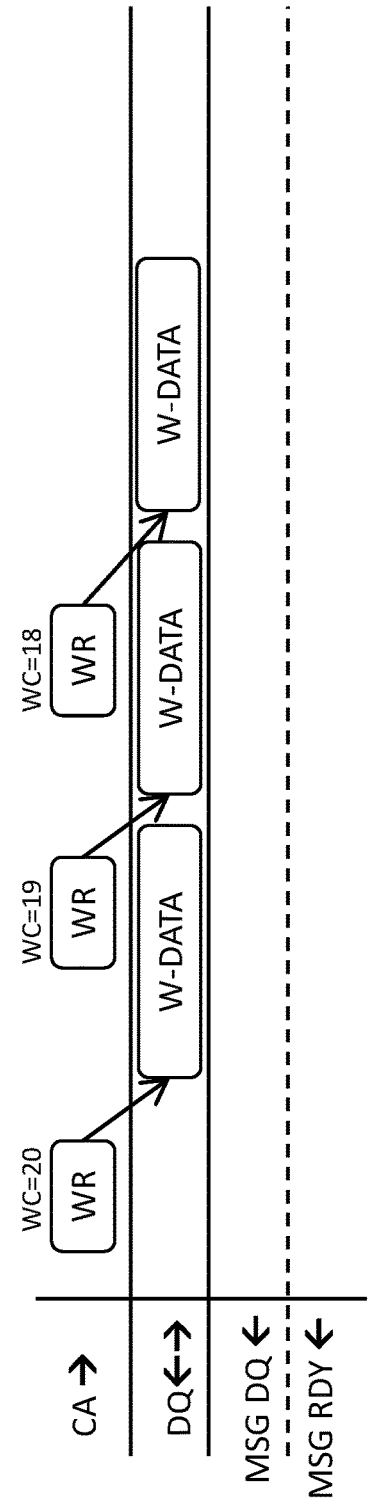
FIG. 3B illustrates a timing diagram of an example write cycle, according to one embodiment.

FIG. 3B illustrates a timing diagram of an example write cycle, according to one embodiment. After the host issues a Write request (WR) command, the corresponding data is presented on the data bus after a predefined and fixed latency. The host keeps counting the write credit (WC) to determine how many more write operations can be sent to the memory module.

Figure 3C:
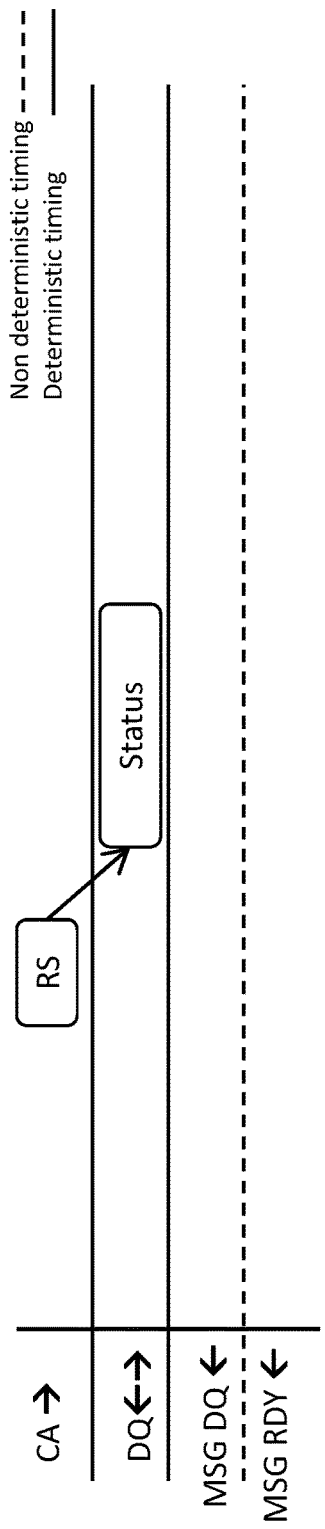
FIG. 3C illustrates a timing diagram of an example read status cycle, according to another embodiment.

FIG. 3C illustrates a timing diagram of an example read status cycle, according to one embodiment. After the host issues a Read Status (RS) command, the corresponding status package is presented on the data bus after a predefined and fixed latency. The host uses the Read Status (RS) command to update the write credit (WC), which is the number of entry available in the memory module's write buffer. The host may not issue any write operation until there is write buffer entries available at the memory module (i.e., WC>0).

The write credit may also be updated using a MSG DQ in the read data package. One or more bits in the MSG DQ in the read data package may be used to indicate that there are 1 or a certain number of WC available in the memory module.

A status information message may also include one or more write IDs (WIDs) so that the memory module may return the information for a write status. For example, data write ID can be used as a write confirmation to a previous write command. When the received Write ID matches the write ID sent by the host, the write is confirmed. An error-correcting code (ECC) protection, such as cyclic redundancy check (CRC) or parity, may be used for packet integrity protection at the MSG_DQ. A status information message may also include other information, including ready package count, internal status of NVM, status of previous command or operation, and any RAS information and interrupt service information.

The number of cycles over which the feedback status is communicated between the memory controller and the memory module may be determined by a particular memory module and/or may be selectively configured by the memory controller at initialization of the memory module. The specific configuration of feedback status information that is communicated between the memory controller and the memory module may vary depending on the number of cycles over which the feedback status is communicated or on the clock speed of the feedback status. For example, if three (3) connector pins are repurposed as the Message Data bus (MSG DQ), the feedback status may be transferred over four (4) single data rate (SDR) cycles. In this case, the feedback status may include 12 bits of data. In addition, another pin can be repurposed as Read Ready Pins (Read_Ready). As another example in which eight (8) connector pins are repurposed, the feedback status may include 16 bits of information and use two (2) SDR cycles to transfer the feedback status. In another example in which three (3) connector pins are repurposed, 2 pins are used for status, and the other pin is used as data strobe of status. The feedback status in this example may include 16 bits of information and use eight (8) double data rate (DDR) cycles to transfer the feedback status. It should be understood that the number of cycles and/or the number of bits conveying feedback status information is not limited to the examples that are disclosed herein.

The memory controller may distinguish normal data packets and status packets by reading the first bit of the feedback status message, MSG[0], in cycle 1. That is, if the MSG[0] bit is "0," then the memory controller can decode the packet as a normal data package. If the MSG[0] bit is "1," the memory controller can decode the packet as a status packet.

In one embodiment, the read or write command is delivered with an extension command. The extension command carries other information such as extended address, Transaction ID, and transaction priority related to the read or write command. The extension command can be delivered one (1) clock cycle before or after the corresponding read or write command. When the extension command is used, each read or write command can occupy 2 cycles on the command bus.

According to one embodiment, the present asynchronous communication protocol can support a Send (SEND) command. The SEND command may be used to initialize a data burst transaction from the memory module to the host with a deterministic timing.

The SEND command may be defined as set forth in Table 1. The SEND command can carry up to 10 bits burst command that is used to specify how many packages are requested in the burst.

TABLE 1

SEND Message

| SEND | Function |
| --- | --- |
| H | CKE Previous Cycle |
| H | CKE Current Cycle |
| H | ACT_n |
| L | RAS_n/A16 |
| H | CAS_n/A15 |
| H | WE_n/A14 |
| X | BG1 |
| L | BG0 |
| L | BA1 |
| H | BA0 |
| X | C0-C2 |
| L | A17 |
| H | A13 |
| Burst Count | A9-A0 |
| RFU | BC_n/A12 |
|  | A11, A10 |

Table 2 sets forth an example definition of a Transaction Status Packet, according to one embodiment.

TABLE 2

| Transaction Packet - "Transaction Status" Transaction Packet - "Transaction Status" | | | | |
| --- | --- | --- | --- | --- |
|  | Cycle 1 | Cycle 2 | Cycle 3 | Cycle 4 |
| DQ[63:0] ECC[7:0] | WID0~WID7, WC, RAS, CRC, etc. | | | |
| MSG[0] | 1 | RFU | RFU | RFU |
| MSG[1] | RFU | RFU | RFU | RFU |
| MSG[2] | RFU | RFU | RFU | ECC |

Figure 3D:
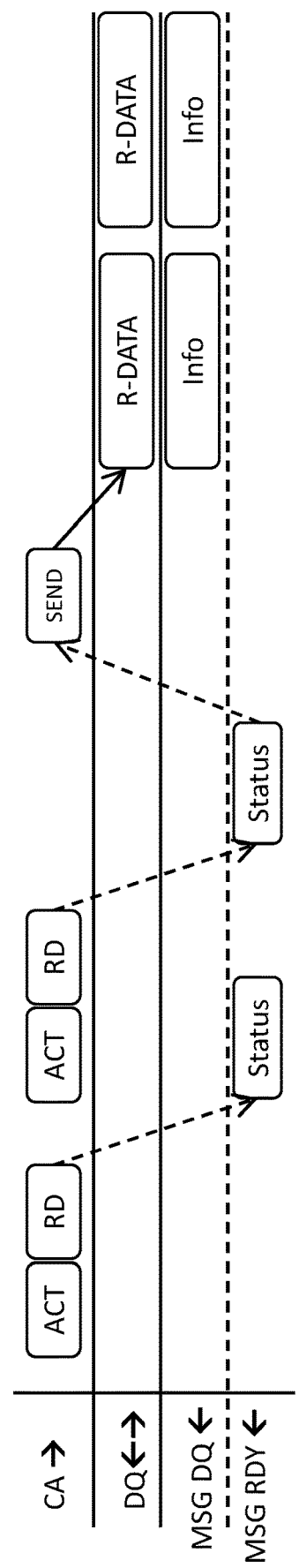
FIG. 3D illustrates a timing diagram of an example SEND cycle, according to one embodiment.

FIG. 3D illustrates a timing diagram of an example SEND cycle, according to one embodiment. In the present example, each of the Ready on the Read_Ready link for each read request can indicate the data package is ready to be read. The host issues a SEND command to start a burst read transaction to read multiple data in a sequence with a fixed read latency (e.g., tRL). The number of the burst requested is also delivered by the Burst Count in the SEND command. The burst read transaction may include data packages or status packages. The memory controller uses the first bit of the feedback status message, MSG[0], in cycle 1 to identify the type of the packages.

FIG. 3E shows a table showing the definition of various commands, according to one embodiment. The present asynchronous communication protocol can support NVM read command, NVM write command, NVM extension command, NVM send command, read status command, and RFU command. Detailed timing diagrams for these commands are explained with reference to FIGS. 3A-3D.

The read ID (RID) is used to identify the relationship between read request and read data from the memory module. The RID can be generated in various ways. In one embodiment, the host can explicitly generate the RID. In this case, the RID is delivered explicitly from the host to the memory module. In another embodiment, both the host and the memory module can explicitly generate RID depending on the type of a read command. In yet another embodiment, neither the host nor the memory module generates an RID explicitly, instead both the host and the memory module agree on and follow an RID mechanic. After a sync up during the initialization, the host and the memory module generate the same RID separately for the same package.

Figure 4:
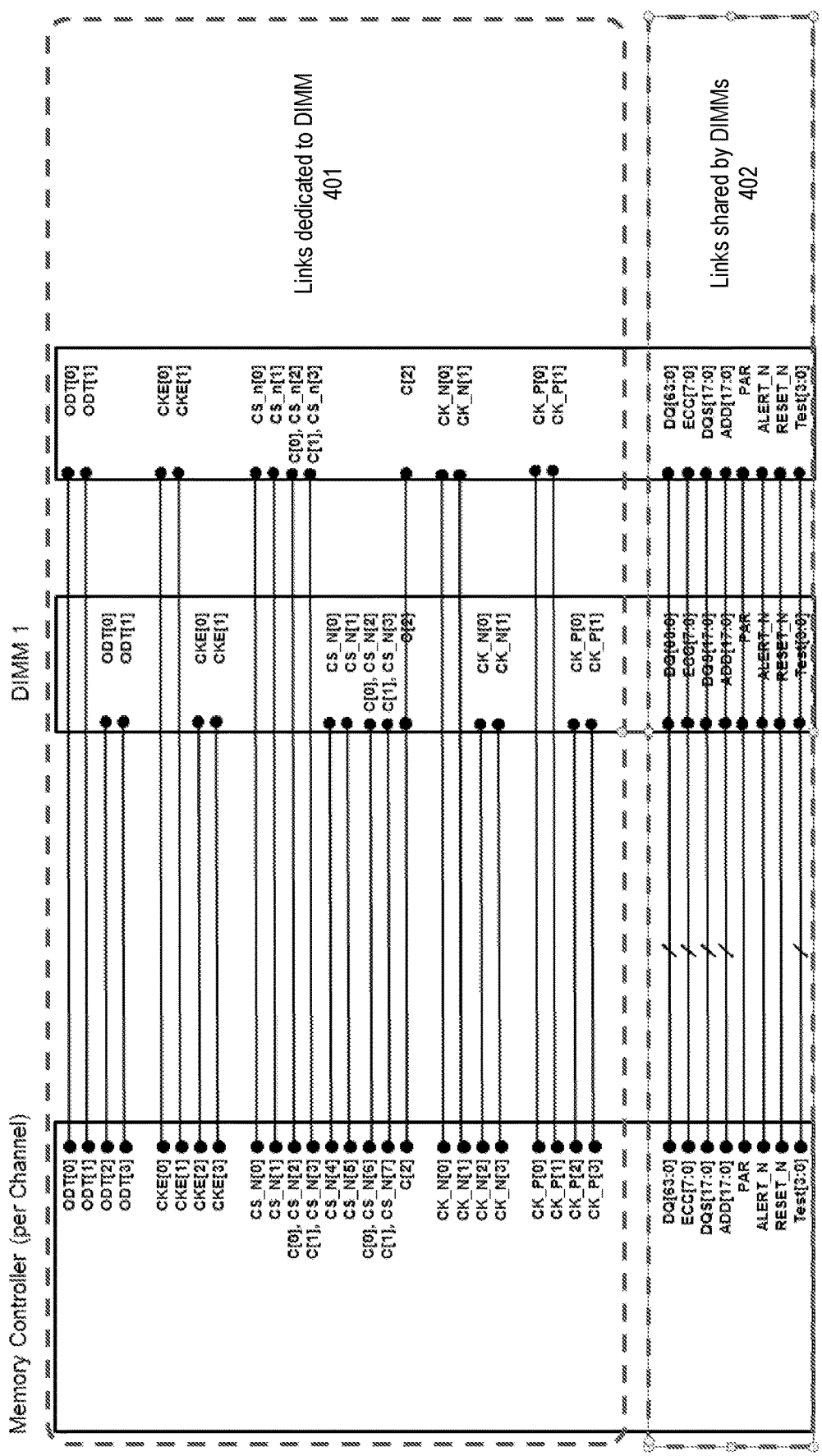
FIG. 4 illustrates pinouts of a memory controller per channel, according to one embodiment.

FIG. 4 illustrates pinouts of a memory controller per channel, according to one embodiment. The pins/links of the memory controller can be divided into a first group 401 that is dedicated to a specific DIMM and a second group 402 that is shared by multiple DIMMs. The definitions of the pins/links of the memory channel are well known in the art, for example, described in the Joint Electron Device Engineering Council (JEDEC) standard. According to one embodiment, the present asynchronous communication protocol can use various feedback pins/links to allow the memory module to provide device feedback to the memory controller.

According to one embodiment, dedicated feedback pins are repurposed for the present asynchronous communication protocol. Examples of such dedicated feedback pins include, but are not limited to, ODT[1], CKE[1], CS[1:3], CK_N[1], CK_P[1], and 3 RFUs. These dedicated pins allow simple synchronization between DIMMS in the memory channel.

In some embodiment, the dedicated feedback pins can include ALERT_n. The ALERT_n pin may be shared by multiple DIMMs. In another case, the host and the memory board may be redesigned to have separate and dedicated ALERT_n pins to allow for 2 NVDIMMs per a memory channel.

FIG. 5 is a table showing four examples of dedicated feedback pins, according to one embodiment. Example 1 uses a total of 4 repurposed pins, Examples 2 and 3 use a total of 8 repurposed pins, Example 4 uses 10 repurposed pins, and Example 5 uses 5 repurposed pins. All of these examples can achieve a speed equivalent to an SDR memory module.

In the Example 1 where ODT[1], CKE[1], CS[1] and ALERT_n pins are repurposed, CS[1], ODT[1] and CKE[1] are used for message pins DQ (MSG DQ). The read ready (Read Ready) status can be sent using the ALERT_n pin.

According to another embodiment, shared feedback pins are used for the present extended RAS-CAS protocol. Examples of such shared feedback pins include, but are not limited to DQS9_t~DQS17_t, DQS9_c~DQS17_c, and ALERT_n. In this case, shared pins may be utilized in a time-division scheme similar to time division multiple access TDMA scheme well known in the telecommunication art. The time-division scheme can assign different time slots to different memory devices, each one transmitting in its allotted slot.

Figure 6:
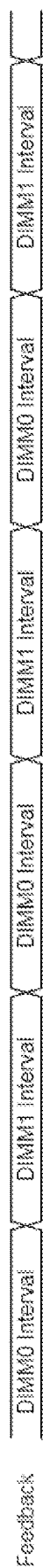
FIG. 6 illustrates an example time division feedback scheme, according to one embodiment.

FIG. 6 illustrates an example time division feedback scheme, according to one embodiment. One or more shared feedback pins may carry device feedback in multiple time slots, and each of the time slots is dedicated for different memory modules. For example, the device feedback includes alternating time slots for DIMM0 and DIMM1. It is noted that the time-division scheme may be employed for transmitting feedback for different memory slots, over different memory channels.

According to another embodiment, hybrid feedback pins are used for the present extended RAS-CAS protocol. The hybrid feedback pins can include both dedicated feedback pins. For example, 32 hybrid feedback pins include 10 dedicated feedback pins (e.g., ODT[1], CKE[1], CS[1:3], CK_N[1], CK_P[1], and 3 reserved for future uses (RFUs)), 18 shared feedback pins (e.g., DQS9_t~DQS17_t, DQS9_c·DQS17_c), and ALERT_n. These hybrid feedback pins can include up to 32 pins allowing easier synchronization compared to only shared pins. For example, the synchronization can be done through dedicated pins, and status transmissions can be done through shared or dedicated pins.

Figure 7:
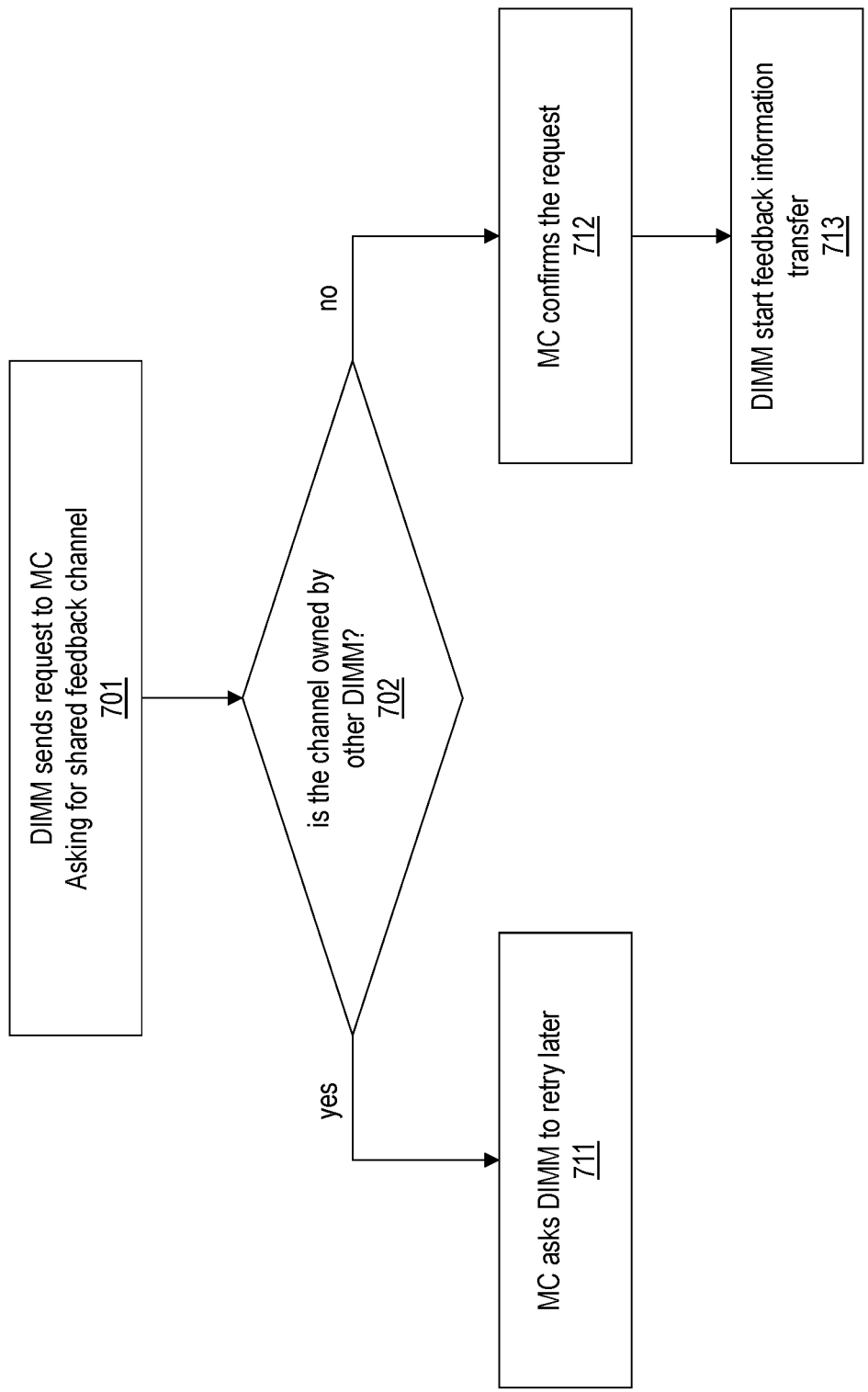
FIG. 7 is a flowchart of an example process for providing device feedback using hybrid feedback pins, according to one embodiment.

FIG. 7 is a flowchart of an example process for providing device feedback using hybrid feedback pins, according to one embodiment. Dedicated pins can be used for synchronization, and both dedicated and shared pins can be used for transmitting device feedback. A DIMM sends a request a memory controller asking for a shared feedback channel among available memory channels (step 701). In response, the memory controller determines whether or not the shared feedback channel is owned by other DIMM (step 702). If the shared feedback channel is owned by other DIMM, the memory controller asks the DIMM to retry layer (step 711). If the shared feedback channel is owned by the requesting DIMM, and the memory controller confirms the request (step 712), and the DIMM starts feedback information transfer to the memory controller (step 713). The steps 701, 711, and 712 use the dedicated pins, and the block 713 uses the hybrid pins.

According to one embodiment, each data request and transmission can include a transaction ID (e.g., Read ID/RID or Write ID/WID) to increase memory parallelism. The transaction ID may include a part or all of the column, row, bank, rank, and channel addresses. The memory controller can issue transactions with different IDs to support multiple simultaneous transactions. In one embodiment, the host can deliver the transaction ID explicitly in a host command. In another embodiment, the transaction ID can be delivered implicitly with the column, row, bank, rank, and channel addresses. The memory module may regenerate the transaction ID by using these addresses.

In another embodiment, both the host and the memory module maintain a transaction ID list. The transaction ID list and ID allocation/deallocation mechanism are initialized during the system boot up. Then, the host and the memory module follow the same mechanism to allocate or free the same transaction ID for each memory transaction inside the host memory controller and the memory module. The transaction ID, in this case, is not required to be delivered explicitly over the memory channel.

According to one embodiment, each status transmission on the device feedback can include RAS information to support in-module RAS features. Examples of such RAS information include, but are not limited to, read/write failure reporting, error-correcting code (ECC), wear leveling and garbage collection information, in-module refresh information, and in-module scrubbing information.

According to one embodiment, the present asynchronous communication protocol defines an ALERT_n pin to carry a bidirectional signal in DDR4. According to one embodiment, the memory module can include two NVDIMMs in DIMM0 and DIMM1 respectively. In this case, the message pins DQ can use dedicated pins, and the read ready (Read_Ready) status can be sent using two ALERT_n pins. FIG. 8 illustrates an example of a signal diagram for an ALERT_n pin carrying a Read_Ready signal, according to one embodiment. The Read_Ready feedback signal is used to request attention from a memory controller. The ALERT_n pin may be used to carry the Read_Ready feedback signal if a memory module operates in a NVDIMM mode by adding a timing definition to the existing ALERT_n pin. In the existing DDR4 specification, the ALERT_n signal is used for signaling the occurrence of two types of errors: a write CRC error, and a command address (CA) parity error. These two errors are distinguishable by the pulse width of the ALERT_n signal. For example, if a write CRC error occurs, under the DDR4 2400 specification the memory module causes the ALERT_n signal to go LOW for between about 6 to about 10 clock cycles. If a command address (CA) parity error occurs, under the DDR4 2400 specification, the memory module causes the ALERT_n signal to go LOW for between about 72 to about 144 clock cycles. According to some embodiments, a short ALERT_n pulse width of between about 2 and about 3 cycles may be used to represent a Read_Ready signal, thereby allowing the ALERT_n signal to function in accordance with the DDR4 2400 specification for an occurrence of a write CRC and for a CA parity. In one embodiment, if the ALERT_n pin carrying the Read_Ready feedback signal can have the lowest priority so that detection of an occurrence of a write CRC or a CA parity is ensured.

FIG. 9 illustrates an example of repurposed message pin assignment and message definition, according to one embodiment. The memory module can use the ALERT_n pin to send a Read_Ready feedback signal to a memory controller. After receiving the Read_Ready feedback signal, the memory controller sends a SEND signal over a second repurposed connector pin (or pins) to pull data packages or status packages information from the memory module. Three repurposed pins ODT[1], CKE[1], and CS_n[1] are repurposed to communicate MSG information to the memory controller together with the data burst in DQ. An example of the MSG information is transaction identification (TID) in a data package. The TID, RID or WID, indicates a transaction identification (ID), which may be similar to part of an address. In an alternative embodiment, the feedback MSG indicates that the packages communicated via the DQ bus are status packages. The relative size of the DQ bus allows numerous information bits to be communicated from the memory module to the memory controller.

Figure 10:
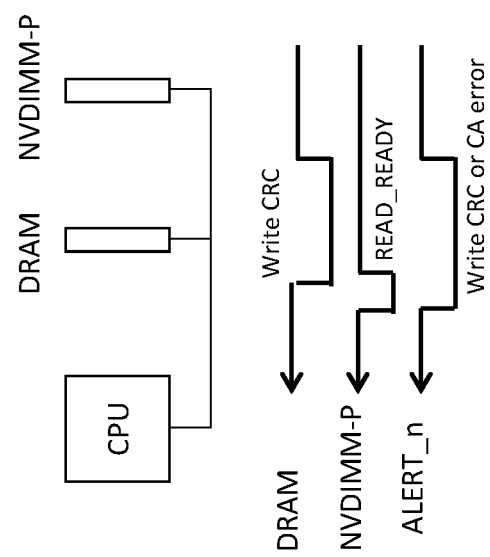
FIG. 10 illustrates an example of a signal diagram for one DRAM and one NVDIMM collocated in the same memory channel, according to one embodiment.

According to another embodiment, the memory module can include one DRAM and one NVM in DIMM0 and DIMM1 respectively. In this case, the message pins DQ can use dedicated pins similar to the dual NVDIMM case, but uses the shared one ALERT_n pin for the Read_Ready status feedback. FIG. 10 illustrates an example of a signal diagram for one DRAM and one NVDIMM collocated in the same memory channel, according to one embodiment. When the Read_Ready signal from the NVDIMM module and the write CRC or the CA error signal from DRAM module are overlapped with each other, the Read_Ready signal may be missing. Therefore, when a write CRC error or CA error is detected, the host may issue a Read Status (RS) command to re-sync the status between the host and NVDIMM module.

Figure 11:
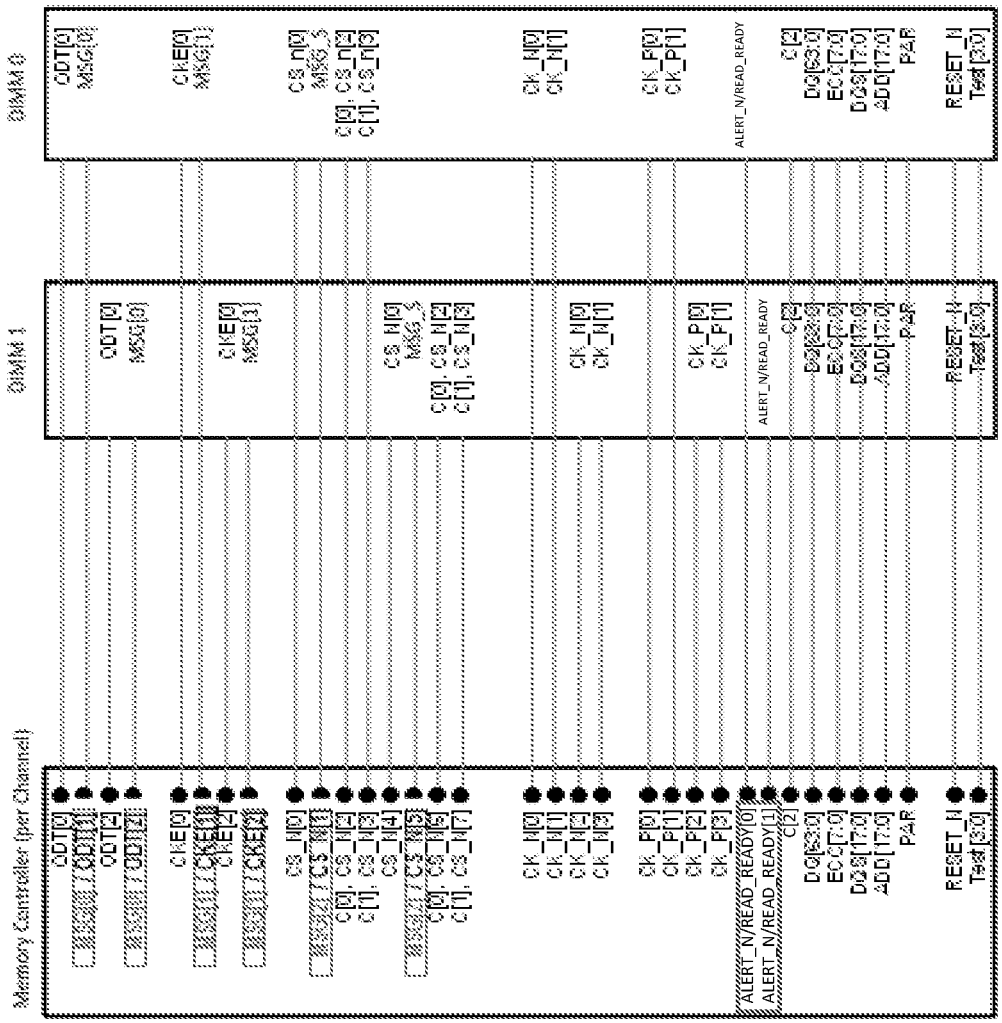
FIG. 11 illustrates an example of repurposed message pin assignment and message definition for a memory module in which two NVDIMM modules are collocated, according to one embodiment.

FIG. 11 illustrates an example of repurposed message pin assignment and message definition for a memory module in which two NVDIMM modules are collocated, according to one embodiment. The connector pins ODT[1], CKE[1], and CS_n[1] can be dedicated to communicate message information as a MSG[0] for DIMM0 while the connector pins ODT[2], CKE[2], and CS_n[5] can be dedicated to communicate message information as a MSG[1] for DIMM1. In one embodiment, the messages may be three bit wide to enable a double data rate (DDR). The ALERT_n/Read_Ready[0] and ALERT_n/Read_Ready[1] can be dedicated to communicate with the NVDIMM 1 and NVDIMM 2 separately. In another example, when one DRAM and one NVDIMM are collocated in the same channel, one shared ALERT_n/Read_Ready[0] can be used.

Table 3 sets forth connector pins for a memory module in a DRAM DIMM mode and in a NVDIMM mode, according to one embodiment. As shown in Table 3, if the memory module is in the DRAM DIMM mode, the ALERT_n* pin (pin 208) operates in a well-known manner to provide a transmit (Tx) and a receive (Rx) function from the point of view of a memory controller. Signals CS_n[1], ODT[1] and CKE[1] (pins 89, 91 and 203, respectively) also operate in a well-known manner to provide a transmit function from the point of view of the memory controller. If the memory module is in the NVDIMM mode, pin 208 is defined as an ALERT_n/Read_Ready signal, and provides both a transmit (Tx) and a receive (Rx) function from the point of view of the memory controller. Pins 89, 91 and 203 are defined as MSG[2:0] and provide a receive function from the point of view of the memory controller. In one embodiment, the ALERT_n/Read_Ready signal and the MSG[2:0] may operate at a single data rate. In another embodiment, the ALERT_n/Read_Ready signal and the MSG[2:0] may operate at DDR.

TABLE 3

Connector pins in a DRAM DIMM mode and in a NVDIMM mode.

| PIN | DRAM DIMM Mode | | NVDIMM Mode | |
|---|---|---|---|---|
| | Name | Tx, Rx | Name | Tx, Rx |
| 89 | CS_n[1] | Tx | MSG[2:0] | Rx |
| 91 | ODT[1] | Tx | | |
| 203 | CKE[1] | Tx | | |
| 208 | ALERT_n | Rx | ALERT_n + Read_Ready | Rx |

Table 4 sets forth the timing and message definition for the ALERT_n connector pin used to carry a Read_Ready signal in the NVDIMM mode, according to one embodiment. In the NVDIMM mode, the ALERT_n connector pin is defined to be 2 clock cycles for a Read_Ready signal. For a pulse width of between about 6 and 10 clock cycles, the ALERT_n connector pin is defined as an occurrence of a write CRC error, and for a pulse width of between 72 and 144 clock cycles, the ALERT_n connector pin is defined as an occurrence of a command address (CA) parity error. If an error occurs, the host has to read the status to update an event.

TABLE 4

Timins and message definition for the ALERT_n connector pin used as a Read_Ready signal in the NVDIMM mode.

| ALERT_n + Read_Ready | Definition |
|---|---|
| 2 | Read_Ready (for NVDIMM) |
| 6~10 | Write CRC error |
| 72~144 | CA parity error |

According to some other embodiments, connector pins ODT[1] and CKE[1] can be used to communicate information respectively as MSG[0] and MSG[1] so that the message is two bits wide, but includes a message strobe signal MSG_S by using CS_n[1] to enable a double data rate (DDR).

According to one embodiment, the extended RAS-CAS protocol can support a persistent write (PWR) command. The PWR command allows the memory controller to write data when the memory controller has WC, and requires the memory module to send an asynchronous write confirm response.

According to one embodiment, a memory module includes: a non-volatile memory; and an asynchronous memory interface to interface with a memory controller. The asynchronous memory interface may use repurposed pins of a double data rate (DDR) memory channel to send an asynchronous data to the memory controller.

The asynchronous data may be device feedback indicating a status of the non-volatile memory.

The device feedback may indicate that requested data from the memory controller is located in a data buffer of the non-volatile memory.

The asynchronous memory interface may be compatible with DDR1, DDR2, DDR3, and/or DDR4.

The repurposed pins may include dedicated data pins that are dedicated to a specific DIMM.

The repurposed pins may include shared data pins that are shared by multiple DIMMs.

Both dedicated data pins that are dedicated to a specific DIMM and shared data pins that are shared by multiple DIMMs may be used to transfer the device feedback.

The device feedback may include a plurality of time slots for multiple DIMMs.

Each of the plurality of time slots of the device feedback may include a transaction ID.

The device feedback may include row address select (RAS) information of the memory module.

The memory module may further include a volatile memory, and the non-volatile memory and the volatile memory may be co-located in the DDR memory channel.

According to another embodiment, a system includes: a memory controller; a memory module comprising a non-volatile memory; and an asynchronous memory interface between the memory controller and the memory module. The asynchronous memory interface may use repurposed pins of a DDR memory channel to send device feedback of the memory module to the memory controller.

The asynchronous memory interface may be compatible with DDR1, DDR2, DDR3, and/or DDR4.

The repurposed pins may include dedicated data pins that are dedicated to a specific DIMM.

The repurposed pins may include shared data pins that are shared by multiple DIMMs.

Both dedicated data pins that are dedicated to a specific DIMM and shared data pins that are shared by multiple DIMMs may be used to transfer the device feedback.

The device feedback may include a plurality of time slots for multiple DIMMs.

Each of the plurality of time slots of the device feedback may include a transaction ID.

The device feedback may include row address select (RAS) information of the memory module.

The memory module may further include a volatile memory, and the non-volatile memory and the volatile memory may be co-located in the DDR memory channel.

According to yet another embodiment, a method includes: providing an asynchronous memory interface between a memory controller and a memory module, wherein the memory module comprising a non-volatile memory; and sending device feedback of the memory module to the memory controller using repurposed pins of a double data rate (DDR) memory channel.

The asynchronous memory interface may be compatible with DDR1, DDR2, DDR3, and/or DDR4.

The method may further include: transferring the device feedback using dedicated data pins that are dedicated to a specific DIMM and shared data pins that are shared by multiple DIMMs.

The method may further include: temporally dividing the device feedback in a plurality of time slots; and assigning each of the time slots for each DIMM of multiple DIMMs.

Each time slot of the device feedback may include a transaction ID indicating the corresponding DIMM.

The memory module may further include a volatile memory, and the non-volatile memory and the volatile memory may be co-located in the DDR memory channel.

The above example embodiments have been described hereinabove to illustrate various embodiments of implementing a system and method for providing an asynchronous communication protocol compatible with the standard synchronous protocol. Various modifications and departures from the disclosed example embodiments will occur to those having ordinary skill in the art. The subject matter that is intended to be within the scope of the invention is set forth in the following claims.

What is claimed is:

1. A memory module comprising:
a non-volatile memory; and
an asynchronous memory interface to interface with a memory controller,
wherein the asynchronous memory interface uses one or more repurposed pins of a double data rate (DDR) memory channel that is operable for synchronous data communication between the memory controller and the memory module to asynchronously access data stored in the non-volatile memory and synchronously or asynchronously send the data to the memory controller using the one or more repurposed pins via the DDR memory channel.

2. The memory module of claim 1, further comprising a volatile memory, wherein the asynchronous memory interface uses one or more pins of the DDR memory channel in addition to the one or more repurposed pins of the DDR memory channel to synchronously or asynchronously send the data to the memory controller via the DDR memory channel.

3. The memory module of claim 2, wherein the non-volatile memory and the volatile memory are co-located in the DDR memory channel.

4. The memory module of claim 1, wherein the memory module asynchronously sends a device feedback indicating a status of the memory module to the memory controller using the one or more repurposed pins of the DDR memory channel in response to a data access request received from the memory controller, and
wherein the memory controller synchronously sends data requested by the data access request using the one or more pins of the DDR memory channel based on the status of the memory module.

5. The memory module of claim 4, wherein the device feedback indicates that the data requested by the data access request from the memory controller is located in a data buffer of the non-volatile memory or loaded into a volatile memory included in the memory module.

6. The memory module of claim 4, wherein the device feedback includes row address select (RAS) information of the memory module.

7. The memory module of claim 1, wherein the one or more repurposed pins include one or more dedicated data pins that are dedicated to a specific dual in-line memory module (DIMM).

8. The memory module of claim 7, wherein the one or more repurposed pins include shared data pins that are shared by multiple DIMMs.

9. The memory module of claim 8, wherein the memory module asynchronously sends a device feedback to the memory controller using the one or more dedicated data pins and the shared data pins.

10. The memory module of claim 9, wherein the device feedback includes a plurality of time slots for the multiple DIMMs.

11. The memory module of claim 10, wherein each of the plurality of time slots of the device feedback includes a transaction ID.

12. A system comprising:
a memory controller;
a memory module comprising a non-volatile memory; and
a double data rate (DDR) memory channel for providing an asynchronous memory interface between the memory controller and the memory module,
wherein the asynchronous memory interface uses one or more repurposed pins of the DDR memory channel to asynchronously access data stored in the non-volatile memory and send the data to the memory controller via the DDR memory channel, and
wherein the asynchronous memory interface uses one or more pins of the DDR memory channel that are used for synchronous data communication between the memory module and the memory controller in addition to the one or more repurposed pins of the DDR memory channel to synchronously or asynchronously send the data to the memory controller using the one or more repurposed pins via the DDR memory channel.

13. The system of claim 12, wherein the memory module asynchronously sends a device feedback indicating a status of the memory module to the memory controller using the one or more repurposed pins of the DDR memory channel in response to a data access request received from the memory controller, and
wherein the memory controller synchronously sends data requested by the data access request using one or more pins of the DDR memory channel that are different from the one or more repurposed pins of the DDR memory channel based on the status of the memory module.

14. The system of claim 12, wherein the one or more repurposed pins include one or more dedicated data pins that are dedicated to a specific dual in-line memory module (DIMM).

15. The system of claim 14, wherein the one or more repurposed pins include shared data pins that are shared by multiple DIMMs.

16. The system of claim 15, wherein the memory module asynchronously sends a device feedback to the memory controller using the one or more dedicated data pins and the shared data pins.

17. The system of claim 16, wherein the device feedback includes a plurality of time slots for the multiple DIMMs.

18. The system of claim 17, wherein each of the plurality of time slots of the device feedback includes a transaction ID.

19. The system of claim 12, wherein the memory module further comprises a volatile memory, and the non-volatile memory and the volatile memory of the memory module are co-located in the DDR memory channel.

20. A method comprising:
providing an asynchronous memory interface between a memory controller and a memory module over a double data rate (DDR) memory channel that is operable for synchronous data communication between the memory controller and the memory module, wherein the memory module comprises a non-volatile memory;
asynchronously accessing data stored in the non-volatile memory of the memory module, from the memory controller; and
synchronously or asynchronously sending the data to the memory controller using one or more repurposed pins via the DDR memory channel.

* * * * *